US012083597B2

(12) United States Patent
Murray et al.

(10) Patent No.: US 12,083,597 B2
(45) Date of Patent: Sep. 10, 2024

(54) DIRECT METAL LASER PRINTING GAS MANIFOLD

(71) Applicant: General Electric Company, Schenectady, NY (US)

(72) Inventors: James J. Murray, Mauldin, SC (US); Shashwat Swami Jaiswal, Karnataka (IN); Rajesh Kumar Venkata Gadamsetty, Karnataka (IN); Hiteshkumar Rameshchandra Mistry, Karnataka (IN)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 17/978,777

(22) Filed: Nov. 1, 2022

(65) Prior Publication Data

US 2024/0139819 A1 May 2, 2024

(51) Int. Cl.
*B22F 12/53* (2021.01)
*B22F 12/40* (2021.01)
*B22F 12/70* (2021.01)
*B33Y 30/00* (2015.01)

(52) U.S. Cl.
CPC .............. *B22F 12/53* (2021.01); *B22F 12/70* (2021.01); *B33Y 30/00* (2014.12); *B22F 12/40* (2021.01)

(58) Field of Classification Search
CPC ..... B22F 12/70; B29C 64/364; B29C 64/371; B33Y 30/00
See application file for complete search history.

(56) References Cited

U.S. PATENT DOCUMENTS

| 10,457,035 B2 | 10/2019 | Coskun et al. |
| 2017/0216916 A1* | 8/2017 | Nyrhilä ................. B22F 10/322 |
| 2020/0108559 A1* | 4/2020 | Tucker .................. B29C 64/371 |
| 2021/0101341 A1 | 4/2021 | Zhang et al. |
| 2022/0341595 A1* | 10/2022 | Kamoi .................. F23D 11/103 |

FOREIGN PATENT DOCUMENTS

| WO | 9208592 A1 | 5/1992 |
| WO | WO-2020099363 A1 * | 5/2020 |

* cited by examiner

*Primary Examiner* — Seyed Masoud Malekzadeh
*Assistant Examiner* — Vipul Malik
(74) *Attorney, Agent, or Firm* — Armstrong Teasdale LLP

(57) ABSTRACT

A gas manifold for single-nozzle deposition chambers comprising a base having a top surface and bottom surface defining a thickness; a primary nozzle having an inlet and outlet extending through the thickness of the base; and a secondary nozzle having an inlet extending partially through the top surface of the base and at least one channel extending a distance from a sidewall of the base having an outlet, the channel in fluid communication with the inlet of the secondary nozzle. The inlet of the primary nozzle has a hollow protrusion extending from the top surface of the base into the gas feed. The channel of the secondary nozzle includes a bend between the sidewall of the base and the outlet configured to pass between a first direct energy source and second direct energy source, the first energy source and second energy source disposed on a top wall of a chamber.

18 Claims, 5 Drawing Sheets

DIRECT METAL LASER PRINTING GAS MANIFOLD

TECHNICAL FIELD

The present disclosure relates generally to additive manufacturing systems, and more particularly to a gas manifold for use with metal laser printing systems.

BACKGROUND

Additive manufacturing systems such as Direct Metal Laser Sintering (DMLS), Direct Metal Laser Melting (DMLM), Selective Laser Sintering (SLS), Direct Metal Laser Deposition (DMLD), and/or Direct Metal Laser Deposition (DMLD) direct an energy beam across a target component to deposit layers of powder material onto the target component. The target component is manufactured by depositing layers of material across the top surface of the target component, and sintering or bonding each layer before depositing of another layer.

The deposition process occurs in an inert deposition chamber which includes a direct energy source, a gas nozzle, and a build fixture. In Laser Power Bed Fusion (LPBF) systems, powder is spread across a build fixture having a recoater assembly, a build platform, and a powder reservoir. Between deposition of additional layers onto the target object, the recoater assembly sweeps powder across the target object and the build platform, while the gas nozzle supplies inert sweeping gas into the chamber to ensure weld spatter is not redeposited onto the target object or build plate. The inert sweeping gas also reduces soot particle interference with the laser path of the direct energy source as the direct energy source produces an energy beam that melts, sinters or otherwise bonds the powered material onto the target component. The target component is at least partially suspended or supported within the build fixture, and the energy beam is generated across the build fixture, bonding the powder material to the target component.

The deposition chamber can include a single direct energy source or a plurality of direct energy sources. The direct energy sources are positioned over the build fixture and are oriented to cover a target area of the build fixture. The deposition chamber can include a single gas nozzle or a plurality of gas nozzles to uniformly distribute the gas over the build fixture. In some embodiments, the deposition chamber includes a single, centrally-located gas nozzle. In other embodiments, the deposition chamber can include multiple gas nozzles to cover a larger target area. Single-nozzle configurations may suffer from variations in deposition or sweeping uniformity and gas delivery. Although multiple-nozzle configurations may provide better deposition or sweeping uniformity and gas delivery than single-nozzle configurations, multiple-nozzle configurations are generally more complex and have more modes of failure. Therefore, there is a need to improve the deposition and sweeping uniformity, as well as and gas delivery in single-nozzle additive manufacturing system configurations.

SUMMARY

In one aspect, a gas manifold for use in an additive manufacturing system is disclosed. The gas manifold includes a base having a top surface and a bottom surface defining a thickness of the base therebetween. The gas manifold further includes a primary nozzle having an inlet and an outlet extending through the thickness of the base. The inlet of the primary nozzle is in fluid communication with an inlet of a chamber of the additive manufacturing system. The gas manifold further includes a secondary nozzle having an inlet extending partially through the top surface of the base and at least one channel extending a distance from a sidewall of the base. The channel includes an outlet, and the channel in fluid communication with the inlet of the secondary nozzle. The inlet of the secondary nozzle in fluid communication with the inlet of the chamber.

In another aspect, an additive manufacturing system is disclosed. The additive manufacturing system includes a chamber having a top wall and a gas feed extending through the top wall, and at least one direct energy source disposed on the top wall. The direct energy source directs an energy beam that bonds powdered material onto a target component positioned within the chamber. The additive manufacturing system further includes a gas manifold having a base that includes a top surface and a bottom surface defining a thickness of the base therebetween. The gas manifold further includes a primary nozzle having an inlet and an outlet extending through the thickness of the base. The inlet of the primary nozzle is in fluid communication with an inlet of a chamber of the additive manufacturing system. The gas manifold further includes a secondary nozzle having an inlet extending partially through the top surface of the base and at least one channel extending a distance from a sidewall of the base. The channel includes an outlet, and the channel in fluid communication with the inlet of the secondary nozzle. The inlet of the secondary nozzle in fluid communication with the inlet of the chamber. The top surface of the base of the gas manifold abuts a top wall of a chamber, and the gas feed is in fluid communication with the primary nozzle and secondary nozzle.

In yet another aspect, a method of forming a gas manifold for use in an additive manufacturing system is disclosed. The method includes the steps of forming a base having a top surface and a bottom surface defining a thickness therebetween. The method further includes the step of forming a primary nozzle having an inlet and an outlet extending through the thickness of the base. The inlet of the primary nozzle is in fluid communication with an inlet of a chamber. The method also includes the step of forming a secondary nozzle having an inlet extending partially through the top surface of the base. The secondary nozzle further has at least one channel extending a distance from a sidewall of the base having an outlet. The channel in fluid communication with the inlet of the secondary nozzle, and the inlet of the secondary nozzle in fluid communication with the inlet of the chamber.

BRIEF DESCRIPTION OF THE DRAWINGS

The subject-matter of the disclosure will be explained in more detail in the following text with reference to exemplary embodiments which are illustrated in the attached drawings.

The reference symbols used in the drawings, and their meanings, are listed in summary form in the list of reference symbols. In principle, identical parts are provided with the same reference symbols in the figures.

DETAILED DESCRIPTION

In the following specification and the claims, reference will be made to a number of terms, which shall be defined to have the following meanings.

As used herein, the singular forms "a," "an," and "the" include plural references unless the context clearly dictates otherwise. The terms "comprising," "including," and "having" are intended to be inclusive and mean that there may be additional elements other than the listed elements. The terms "optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The methods, systems, and apparatus described herein overcome at least some disadvantages of known additive manufacturing systems. More specifically, the systems apparatus described herein improves gas flow delivery uniformity in single-nozzle additive manufacturing system configurations by utilizing a gas manifold having a primary nozzle and a secondary nozzle without modification of the deposition chamber. The primary nozzle and secondary nozzle supply the gas from a single inlet and are oriented to distribute the gas within the deposition chamber. Fluid channels of the gas manifold include one or more bends between the inlet and outlet such that operation of direct energy sources of the deposition chamber is not hindered.

Figure 1:
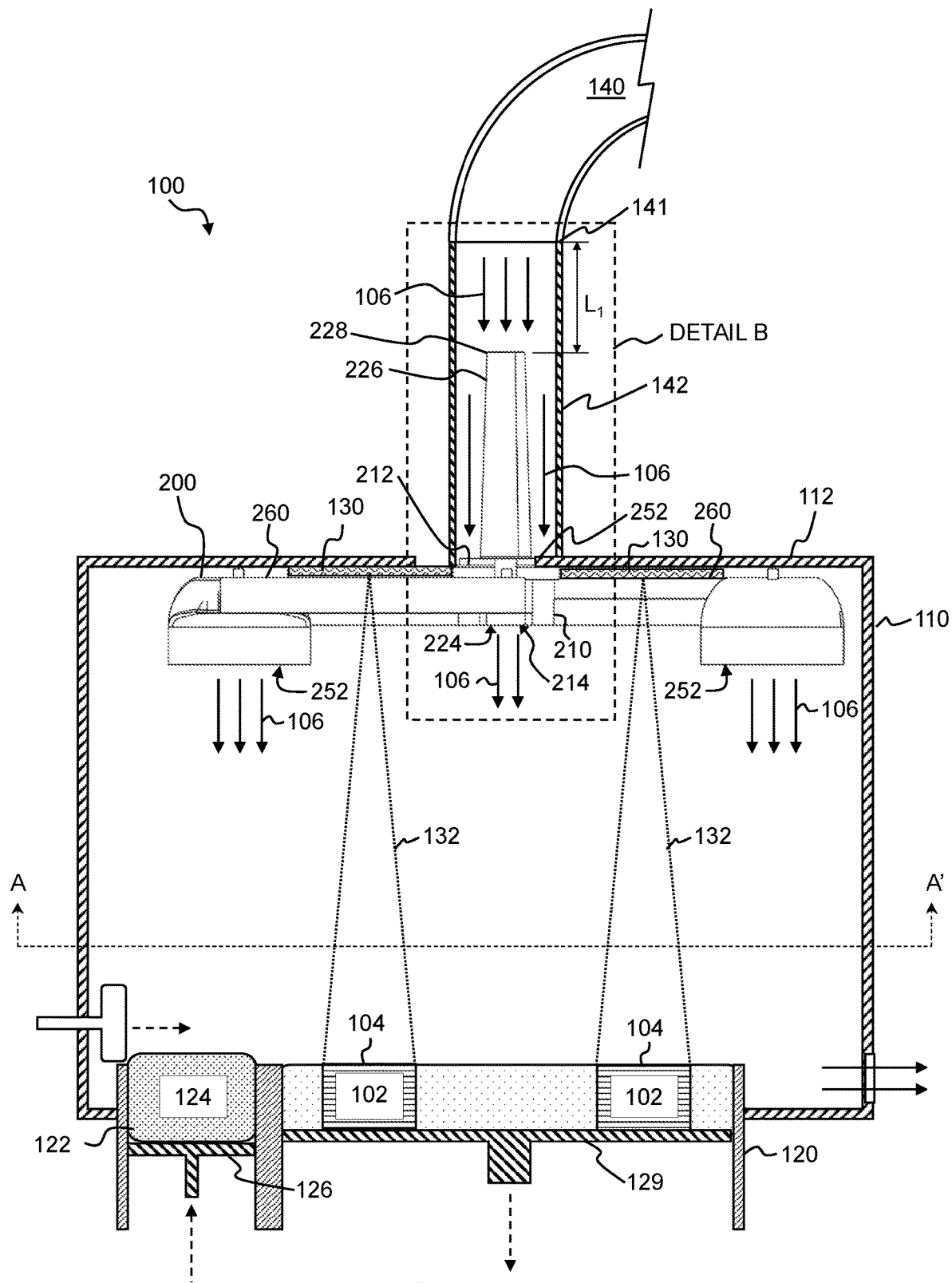
FIG. 1 is a cross-sectional view of an exemplary additive manufacturing system including a gas manifold.
Figure 2:
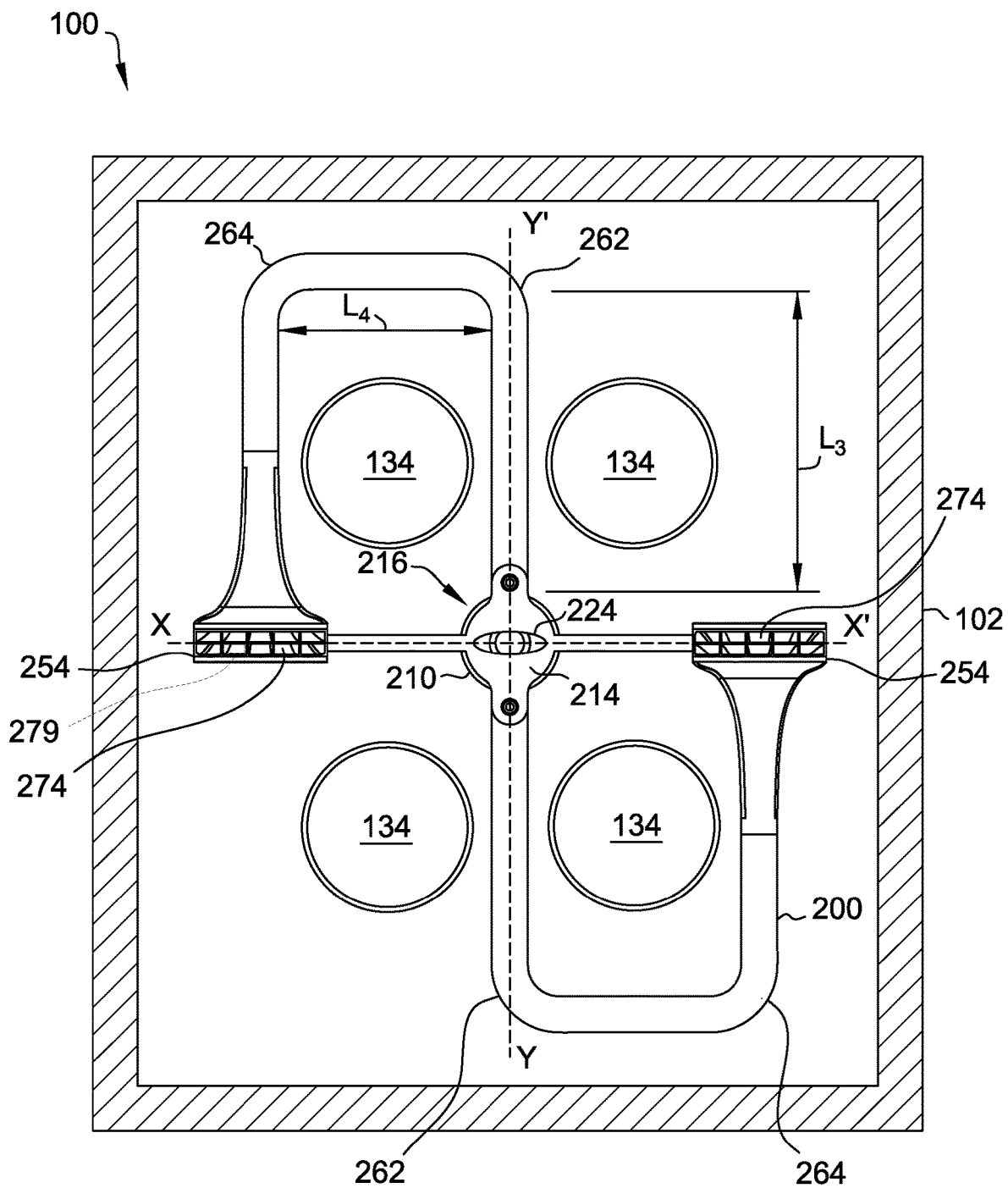
FIG. 2 is a bottom view of the additive manufacturing system of FIG. 1 along the cross-sectional line A-A'.

With reference to FIG. 1, in the exemplary embodiment, additive manufacturing system 100 is a Laser Power Bed Fusion (LPBF) system. In alternative embodiments, additive manufacturing system 100 is any other suitable additive manufacturing system, including, without limitation, one of a Direct Metal Laser Melting (DMLM) system, a Selective Laser Sintering (SLS) system, a Direct Metal Laser Deposition (DMLD) system, a Direct Metal Laser Deposition (DMLD) system, a powder blown additive system, and/or a LasergCusing system. FIG. 1 illustrates a cross-sectional view of a deposition chamber 110. FIG. 2 illustrates a bottom view of the deposition chamber 110 taken along line A-A'.

In the exemplary embodiment, additive manufacturing system 100 includes a build fixture assembly 120, a direct energy source 130 positioned within a deposition chamber 110 and a gas delivery system 140. Moreover, in the exemplary embodiment, the direct energy source 130 includes four heads 134 arranged in a matrix on a top wall 112 of the deposition chamber. The four heads 134 are centrally located relative to an inlet 142 of the gas delivery system 140. In some embodiments, the direct energy source 130 includes at least two heads. In some embodiments, the direct energy source 130 includes more than four heads 134.

As shown in FIG. 1, the build fixture assembly 120 includes a build plate 129 oriented within build fixture 120 and positioned to support one or more target components 102. Build fixture assembly 120 further includes a powder reservoir 122 providing a continuous supply of powdered material 124. Between cycles of deposition, a powder platform 126 raises the powdered material 124 while a recoater 128 spreads raised powdered material 124 across the target component 102. As layers are deposited, the build plate 129 lowers the target components 102 while excess powdered material 124 within a volume above and adjacent to the build plate 129.

Inert gas 106 (illustrated as flow vectors) is supplied through gas delivery system 140 into the deposition chamber 110 and onto the build fixture 120 to sweep weld spatter and soot particles between deposition cycles. During a deposition cycle the direct energy source 130 generates an energy beam 132 through a scanner system which selectively directs the energy beam 132 across the one or more target components 102 and the build fixture 120 generally at a preselected scan speed such that the direct energy beam 132 sinters, or more generally bonds, the powdered material 124 onto a build layer 104 of the target component 102. The direct energy beam 132 is sufficient to fuse preselected regions of the build layer 104 immediately below build layer 104.

Figure 3:
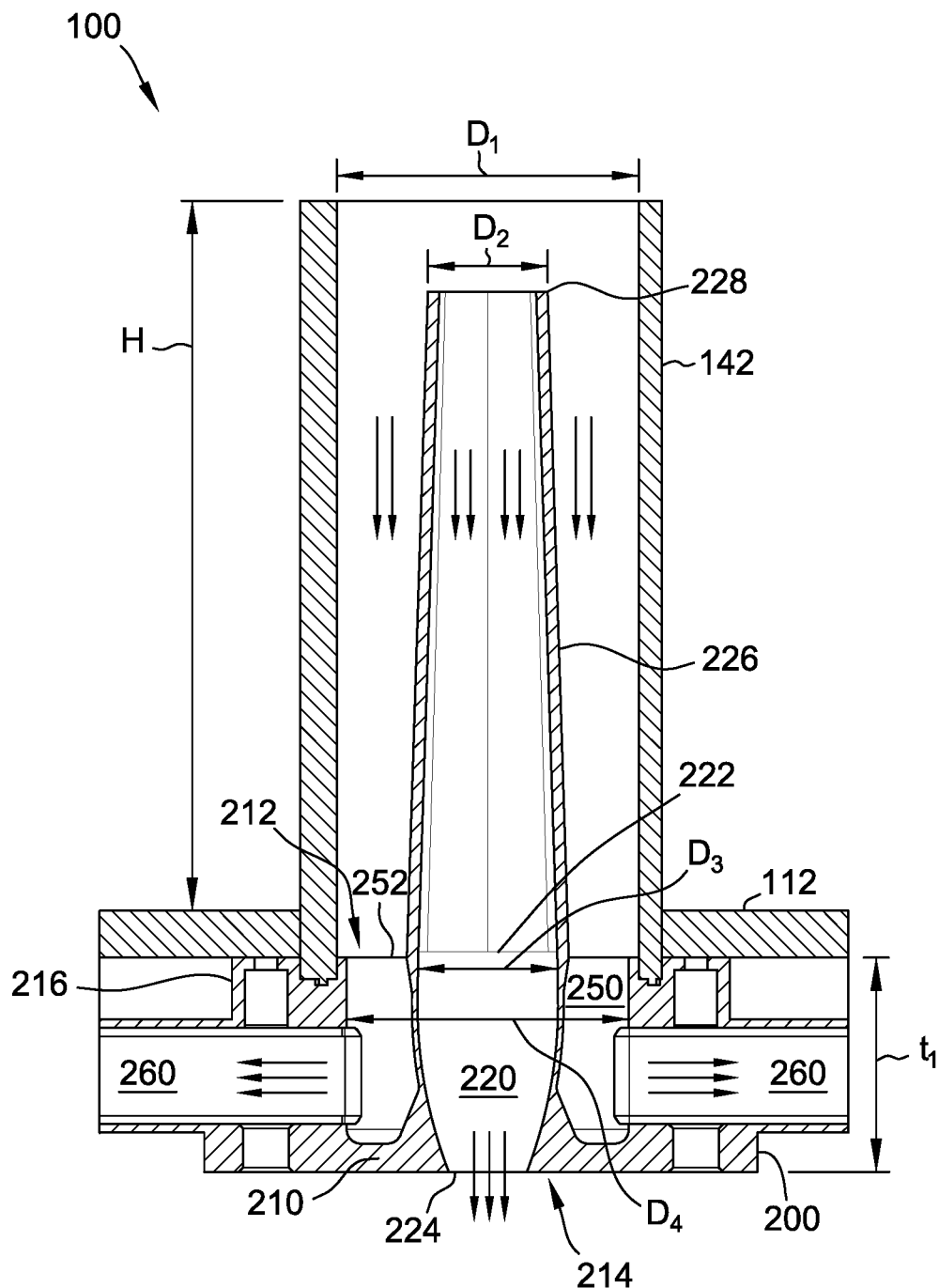
FIG. 3 is an enlarged detailed cross-sectional view of Detail B of the additive manufacturing system of FIG. 1.

In the exemplary embodiment, the inlet 142 is a tube or a cylindrical structure having a height H and a diameter $D_1$ (as shown in FIG. 3). The Inert gas 106 is supplied into the deposition chamber 110 through a nozzle positioned within the deposition chamber 110. In at least some known embodiments, single-nozzle configurations may cause poor distribution of inert gas 106 over the periphery of the build fixture 120 such that weld splatter or soot particles remains, resulting in variance of deposition uniformity. The variance can result in undesirable levels of porosity as additional layers are melted onto the build layer 104 over subsequent deposition cycles. As explained in further detail below, the gas manifold 200 described herein can replace the single nozzle in a single-nozzle configuration without having to alter or change other components of the additive manufacturing system 100.

Figure 4:
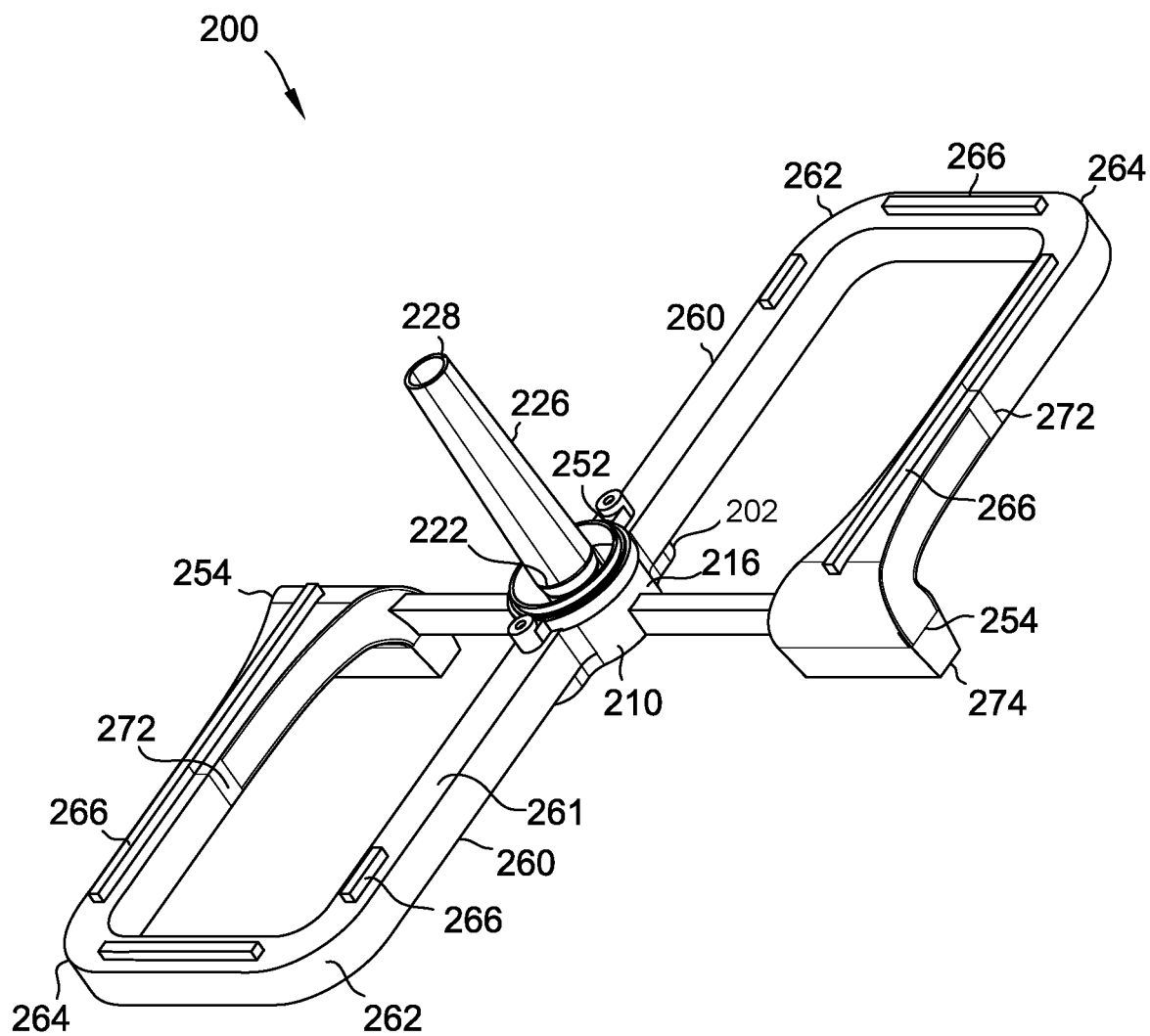
FIG. 4 is a perspective view of the gas manifold of FIG. 1.

FIG. 4 illustrates a perspective view of the gas manifold 200, FIGS. 1 and 3 illustrate side views of the gas manifold 200 positioned within the deposition chamber and FIG. 2 illustrates the gas manifold 200 oriented relative to the four heads 134 of the direct energy source 130. In the exemplary embodiment, the gas manifold 200 has a primary nozzle 220 and a secondary nozzle 250 that are both supplied inert gas 106 from the inlet 142 of the gas delivery system 140. The primary nozzle 220 and a secondary nozzle 250 are in fluid communication with the inlet 142 of the gas delivery system 140 and distribute the Inert gas 106 across multiple outlets as explained in more detail below. As a result, manifold 200 facilitates improved deposition uniformity and gas delivery of the inert gas 106 across the build fixture assembly 120.

The gas manifold 200 includes a base 210 having a top surface 212 and a bottom surface 214. The top surface 212 and bottom surface 214 define a thickness $t_1$ of the base 210 (as shown in FIG. 3). The primary nozzle 220 includes an inlet 222 and an outlet 224 extending through the thickness $t_1$ of the base 210. As shown in FIG. 2, in the exemplary embodiment, the outlet 224 of the primary nozzle 220 has an elliptical shape, a slit shape or a generally circular shape and is configured to supply inert gas 106 across the build fixture assembly 120 (as shown in FIG. 1). In alternative embodiments, outlet 224 may have any other shape that enables nozzle 200 to function as described herein. In some embodiments, the inlet 222 of the primary nozzle includes a hollow protrusion 226 extending from the top surface 212 of the base 210. The secondary nozzle 250 includes an inlet 252 extending partially through the top surface 212 of the base 210 and at least one channel 260 in fluid communication with the inlet 252 extending from a sidewall of the base 210. The at least one channel 260 includes an outlet 254 oriented to spray or distribute inert gas 106 across the build fixture assembly 120 (as shown in FIG. 1).

As best shown in FIGS. 3 and 4, the inlet 222 of the primary nozzle 220 and the inlet 252 of the secondary nozzle 250 are circular in shape and are concentrically aligned with one another. In alternative embodiments, the inlet 222 of the primary nozzle 220 and the inlet 252 of the secondary nozzle 250 may have any shape or orientation that enables the inlet 222 of the primary nozzle 220 and the inlet 252 of the secondary nozzle 250 to function as described herein. At the top surface 212 of the base, the inlet 222 of the primary nozzle 220 has a diameter $D_3$ that is smaller than a diameter $D_4$ of the inlet 252 of the secondary nozzle 250.

The top surface 212 of the base 210 is against the top wall 112 of the deposition chamber 110 such that both the inlet 222 of the primary nozzle 220 and the inlet 252 of the secondary nozzle 250 are in fluid communication with the inlet 142 of the gas delivery system 140. In embodiments where the primary nozzle 220 includes the hollow protrusion 226 extending from the top surface 212 of the base, the hollow protrusion 226 extends a distance into the inlet 142 of the gas delivery system 140 such that the hollow protrusion 226 captures a portion of the Inert gas 106 as the Inert gas 106 is injected through the inlet 142 of the gas delivery system 140 into the deposition chamber 110. In some embodiments, the protrusion 226 tapers inwardly from the base 210. The protrusion 226 has an end 228 that is opposite the base 210. The end 228 has a diameter $D_2$ that is smaller than the diameter $D_3$ of the inlet 222 of the primary nozzle 220 at the base 210. The diameter $D_2$ of the end 228 of the protrusion 226 is smaller than the diameter $D_1$ of the gas feed. The end 228 of the protrusion 226 is positioned a distance $L_1$ from an edge 141 of the inlet 142 of the gas delivery system 140. In the exemplary embodiments, the inlet 142 has a generally cylindrical shape which can be coupled to a hose or coil.

Because the diameter $D_2$ of the end 228 of the protrusion 226 is smaller than the diameter $D_1$ of the inlet 142. The Inert gas 106 supplied by the inlet 142 can flow to both the primary nozzle 220 and to the secondary nozzle 250. The ratio of the size of end 228 of the protrusion 226 relative to the diameter $D_1$ of the gas feed can vary depending on the desired amount of Inert gas 106 delivered to the primary nozzle 220 and the secondary nozzle 250. In some embodiments, the ratio of the diameter $D_2$ of the end 228 of the protrusion 226 relative to the diameter $D_1$ of the inlet 142 is in the range of 1:10 to 9:10. In alternative embodiments, the diameter $D_2$ of the end 228 of the protrusion 226 relative to the diameter $D_1$ of the inlet 142 may have any ratio that enables the primary nozzle 220 and secondary nozzle 250 to function as described herein In some embodiments, the cross-sectional surface area of the inlet 142 decreases from the top surface 212 of the base 210 towards the end 228 of the protrusion 226 because of the taper of the protrusion 226. The decreased cross-sectional area results in creating a higher static pressure of the Inert gas 106 at the inlet 252 of the secondary nozzle as compared to the static pressure at the end 228 of the protrusion 226. As explained in more detail below, Inert gas 106 traveling through the secondary nozzle 250 requires additional static pressure because of the at least one channel 260 between the inlet 252 and outlet 254 of the secondary nozzle 250. Likewise, as best shown in FIG. 3, in some embodiments the taper of the protrusion 226 also results in a decrease of static pressure for the primary nozzle 220 to enable the primary nozzle 220 and secondary nozzle 250 to displace the desired amount of Inert gas 106.

As shown in FIGS. 1 through 4, the inlet 252 of the secondary nozzle 250 is in fluid communication with the at least one channel 260 extending from the side wall 216 of the base 210. The gas manifold 200 in some embodiments includes two channels 260a and 260b, each having the same features as the channel 260. Channel 260 is between two heads 134 and extends a length $L_3$ (as shown in FIG. 2) defining an X-X' axis. Moreover, channel 260 extends the length $L_3$ such that a first bend 262 of channel 260 does not interfere with operation of the head 134. In the exemplary embodiment, the first bend 262 extends substantially perpendicular to the X-X' axis and substantially parallel to a Y-Y' axis. The Y-Y' axis is normal to the X-X' at the base 210. In the exemplary embodiment, the first bend 262 extends a length $L_4$ to a second bend 264, such that the first bend 262, second bend 264 and channel 260 generally do not interfere with operation of the head 134. The second bend 264 extends substantially perpendicular to the first bend 262 and is substantially parallel to the Y-Y' axis. In some embodiments, the outlet 254 of the secondary nozzle 250 extends from the second bend 264 by at least the length $L_3$ such that the outlet 254 of the secondary nozzle 250 is on the same axis X-X' as the outlet 224 of the primary nozzle 220. The first bend 262 is substantially perpendicular to the at least one channel 260 extending from the base 210 and the second bend 264 is substantially perpendicular to the first bend 262. Stated differently, the at least one channel 260 forms a U-shape or a semicircular shape such that the that the outlet 254 of the secondary nozzle 250 is on the same axis X-X' as the outlet 224 of the primary nozzle 220. Alternatively, in some embodiments, the at least one channel 260 does not have bends. Moreover, in some embodiments, the outlet 254 of the secondary nozzle 250 extends from the base 210 by the length $L_3$. In alternative embodiments, the first bend 262 and the second bend 264 may have any shape or orientation that enables the channel 260 to function as described herein.

Figure 5:
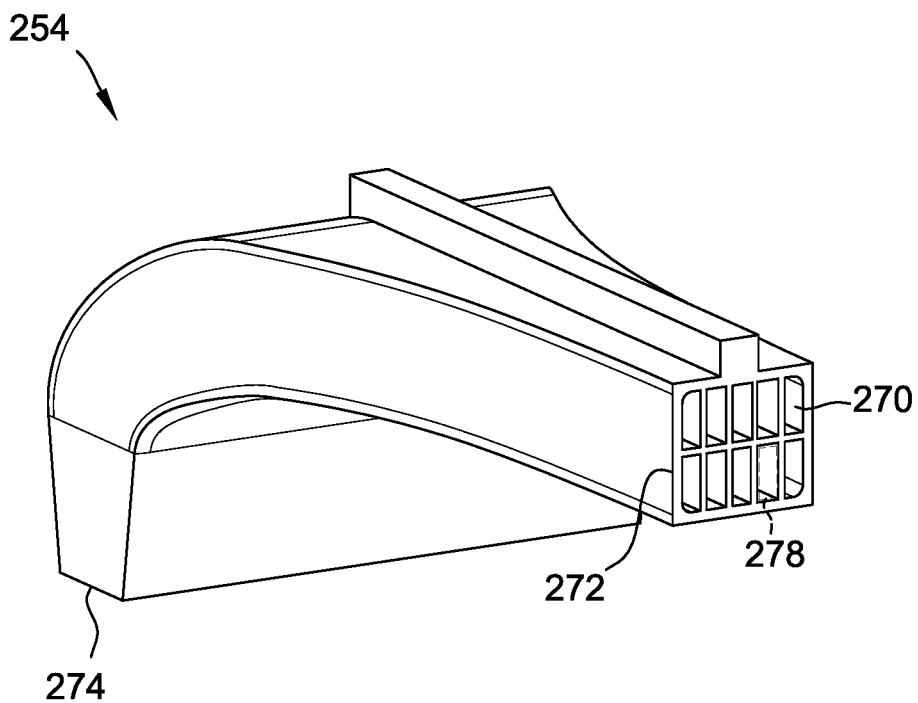
FIG. 5 is a perspective view of a secondary nozzle used with the gas manifold of FIG. 1.

As best shown in FIGS. 2 and 5, the outlet 254 of the secondary nozzle 250 includes a plurality of flow expansion channels 270, each flow expansion channel 270 has a first end 272 and a second end 274. The flow expansion channels 270 are oriented as a gas diffuser wherein the first end 272 has a smaller cross-sectional area 278 than a cross-sectional area 279 of the second end 274. The first end 272 of each flow expansion channel 270 is in fluid communication with channel 260 and the second end 274 of each expansion channel 270 is oriented as the outlet 254 of the secondary nozzle 250.

As shown in FIG. 4, in some embodiments, the gas manifold 200 includes support structures 202 connecting the outlet 254 of the secondary nozzle 250 to the base 210. In some embodiments, a top surface 261 of the channel 260 includes a plurality of standoffs 266 that extend from the top surface 261. The standoffs 266 abut the top wall 112 of the deposition chamber 110 and provide structural rigidity to the at least one channel 260.

The above-described embodiments overcome at least some disadvantages of known methods for repairing components. Specifically, the embodiments improve gas delivery uniformity in single-nozzle additive manufacturing system configurations by utilizing a gas manifold having a primary nozzle and a secondary nozzle without modification of the deposition chamber to distribute the gas. The primary nozzle and secondary nozzle supply the gas from a single inlet and are oriented to distribute the gas within the deposition chamber. Fluid channels of the gas manifold include one or more bends between the inlet and outlet such that operation of direct energy sources of the deposition chamber is not hindered. The gas manifold described herein can replace the single nozzle in a single-nozzle configuration without having to alter or change other components of the additive manufacturing system.

The methods, systems, and compositions disclosed herein are not limited to the specific embodiments described herein, but rather, steps of the methods, elements of the systems, and/or elements of the compositions may be utilized independently and separately from other steps and/or elements described herein. For example, the methods, systems, and compositions are not limited to practice with only a rotary machine as described herein. Rather, the methods, systems, and compositions may be implemented and utilized in connection with many other applications.

Although specific features of various embodiments may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

A gas manifold for use in an additive manufacturing system comprising: a base having a top surface and a bottom surface defining a thickness therebetween; a primary nozzle having an inlet and an outlet extending through the thickness of the base, the inlet of the primary nozzle in fluid communication with an inlet of a chamber; and, a secondary nozzle having an inlet extending partially through the top surface of the base and at least one channel extending a distance from a sidewall of the base having an outlet, the channel in fluid communication with the inlet of the secondary nozzle, the inlet of the secondary nozzle in fluid communication with the inlet of the chamber.

2. The gas manifold of the preceding clause, wherein the outlet of the primary nozzle has one of an elliptical shape, a slit shape and a circular shape.

3. The gas manifold in accordance with any preceding clause, wherein the inlet of the secondary nozzle has a substantially circular shape that is substantially concentrically oriented with the inlet of the primary nozzle, the inlet of the secondary nozzle having a substantially circular shape, wherein a diameter of the inlet of the primary nozzle is smaller than a diameter of the inlet of the secondary nozzle.

4. The gas manifold in accordance with any preceding clause, wherein the inlet of the primary nozzle has a protrusion extending from the top surface of the base.

5. The gas manifold in accordance with any preceding clause, wherein the protrusion tapers inwardly from the base, such that an end of the protrusion is smaller than the diameter of the inlet of the primary nozzle at the base.

6. The gas manifold in accordance with any preceding clause, wherein the top surface of the base contacts a top wall of a chamber, the chamber having a gas feed extending through the top wall of the chamber in fluid communication with the primary nozzle and secondary nozzle, the protrusion extending a distance into the gas feed.

7. The gas manifold in accordance with any preceding clause, wherein a diameter of the end of the protrusion is smaller than a diameter of the gas feed.

8. The gas manifold in accordance with any preceding clause, wherein a ratio of the diameter of the end of the protrusion to the diameter of the gas feed is in the range of 1:10 to 9:10.

9. The gas manifold in accordance with any preceding clause, wherein the at least one channel of the secondary nozzle includes at least one bend defined between the sidewall of the base and the outlet.

10. The gas manifold in accordance with any preceding clause, wherein the at least one bend is one of U-shaped and semi-circular.

11. The gas manifold in accordance with any preceding clause, wherein the at least one bend extends between a first direct energy source and a second direct energy source, the first energy source and the second energy source on a top wall of a chamber.

12. The gas manifold in accordance with any preceding clause, wherein the at least one channel of the secondary nozzle includes a first bend and a second bend, the first bend normal to the at least one channel, the second bend normal to the first bend, the outlet of the secondary nozzle extending a distance from the second bend.

13. The gas manifold in accordance with any preceding clause, wherein the outlet of the secondary nozzle includes a plurality of flow channels, each of the flow channels having a first end and a second end, the first end having a smaller cross-sectional area than the second end.

14. An additive manufacturing system comprising: a chamber comprising a top wall and a gas feed extending through the top wall and at least one direct energy source disposed on the top wall, the direct energy source directs an energy beam that bonds powdered material onto a target component positioned within the chamber; and, a gas manifold comprising: a base having a top surface and a bottom surface defining a thickness; a primary nozzle having an inlet and an outlet extending through the thickness of the base; and, a secondary nozzle having an inlet extending partially through the top surface of the base and at least one channel extending a distance from a sidewall of the base having an outlet, the channel in fluid communication with the inlet of the secondary nozzle; wherein the top surface of the base abuts a top wall of a chamber, the gas feed in fluid communication with the primary nozzle and secondary nozzle.

15. The system of the preceding clause, wherein the inlet of the primary nozzle has a hollow protrusion extending from the top surface of the base.

16. The system in accordance with any preceding clause, wherein the protrusion tapers inwardly from the base, the protrusion having an end opposite the base, the end having a diameter smaller than the diameter of the inlet of the primary nozzle at the base.

17. The system in accordance with any preceding clause, wherein the protrusion extends a distance into the gas feed.

18. The system in accordance with any preceding clause, wherein the at least one channel of the secondary nozzle includes a first bend and a second bend, the first bend normal to the at least one channel, the second bend normal to the first bend, the outlet of the secondary nozzle extending a distance from the second bend.

19. The system of system in accordance with any preceding clause, wherein the first bend and a second bend are positioned to pass between a first direct energy source and a second direct energy source.

20. A method of forming a gas manifold for use in an additive manufacturing system comprising: forming a base having a top surface and a bottom surface defining a thickness therebetween; forming a primary nozzle having an inlet and an outlet extending through the thickness of the base, the inlet of the primary nozzle in fluid communication with an inlet of a chamber; and, forming a secondary nozzle having an inlet extending partially through the top surface of the base and at least one channel extending a distance from a sidewall of the base having an outlet, the channel in fluid communication with the inlet of the secondary nozzle, the inlet of the secondary nozzle in fluid communication with the inlet of the chamber.

What is claimed is:

1. A gas manifold for use in an additive manufacturing system comprising:
    a base having a top surface and a bottom surface defining a thickness therebetween;
    a primary nozzle having an inlet and an outlet extending through the thickness of the base, the inlet of the primary nozzle in fluid communication with an inlet of a chamber; and,
    a secondary nozzle radially outward from the primary nozzle, the secondary nozzle having an inlet extending partially through the top surface of the base and at least one channel extending a distance from a sidewall of the base and having an outlet, the channel in fluid communication with the inlet of the secondary nozzle, the inlet of the secondary nozzle in fluid communication with the inlet of the chamber, wherein the outlet of the secondary nozzle includes a plurality of flow channels that each extend from a first end having a first cross-sectional area to a second end having a second cross-sectional area that is larger than the first cross-sectional area.

2. The gas manifold of claim 1, wherein the outlet of the primary nozzle has one of an elliptical shape, a slit shape and a circular shape.

3. The gas manifold of claim 1, wherein the inlet of the secondary nozzle has a substantially circular shape that is substantially concentrically oriented with the inlet of the primary nozzle, wherein a diameter of the inlet of the primary nozzle is smaller than a diameter of the inlet of the secondary nozzle.

4. The gas manifold of claim 1, wherein the inlet of the primary nozzle has a protrusion extending from the top surface of the base.

5. The gas manifold of claim 4, wherein the protrusion tapers inwardly from the base, such that a diameter of an end of the protrusion is smaller than a diameter of the inlet of the primary nozzle at the base.

6. The gas manifold of claim 5, wherein the top surface of the base contacts a top wall of the chamber, the chamber having a gas feed extending through the top wall of the chamber in fluid communication with the primary nozzle and secondary nozzle, the protrusion extending into the gas feed.

7. The gas manifold of claim 6, wherein the diameter of the end of the protrusion is smaller than a diameter of the gas feed.

8. The gas manifold of claim 7, wherein a ratio of the diameter of the end of the protrusion to the diameter of the gas feed is in the range of 1:10 to 9:10.

9. The gas manifold of claim 1, wherein the at least one channel of the secondary nozzle includes at least one bend defined between the sidewall of the base and the outlet of the secondary nozzle channel.

10. The gas manifold of claim 9, wherein the at least one bend is one of U-shaped and semi-circular.

11. The gas manifold of claim 9, wherein the at least one bend extends between a first direct energy source and a second direct energy source, the first energy source and the second energy source on a top wall of the chamber.

12. The gas manifold of claim 1, wherein the at least one channel of the secondary nozzle includes a first bend and a second bend, the first bend normal to the at least one channel, the second bend normal to the first bend, the outlet of the secondary nozzle extending outwardly from the second bend.

13. An additive manufacturing system comprising:
    a chamber comprising a top wall and a gas feed extending through the top wall and at least one direct energy source disposed on the top wall, the direct energy source directs an energy beam that bonds powdered material onto a target component positioned within the chamber; and,
    a gas manifold comprising:
    a base having a top surface and a bottom surface defining a thickness;
    a primary nozzle having an inlet and an outlet extending through the thickness of the base; and,
    a secondary nozzle radially outward from the primary nozzle, the secondary nozzle having an inlet extending partially through the top surface of the base and at least one channel extending a distance from a sidewall of the base and having an outlet, the channel in fluid communication with the inlet of the secondary nozzle;
    wherein the top surface of the base abuts the top wall of a chamber, the gas feed in fluid communication with the primary nozzle and secondary nozzle.

14. The system of claim 13, wherein the inlet of the primary nozzle has a hollow protrusion extending from the top surface of the base.

15. The system of claim 14, wherein the hollow protrusion tapers inwardly from the base, the hollow protrusion having an end opposite the base, the end having a diameter smaller than the diameter of the inlet of the primary nozzle at the base.

16. The system of claim 14, wherein the hollow protrusion extends into the gas feed.

17. The system of claim 13, wherein the at least one channel of the secondary nozzle includes a first bend and a second bend, the first bend normal to the at least one channel, the second bend normal to the first bend, the outlet of the secondary nozzle extending outwardly from the second bend.

18. The system of claim 17, wherein the first bend is positioned to pass between a first direct energy source and a second direct energy source.

* * * * *